United States Patent
Pendleton et al.

(10) Patent No.: US 7,213,610 B2
(45) Date of Patent: *May 8, 2007

(54) DROP TUBE SEGMENTS ADAPTED FOR USE WITH A LIQUID RESERVOIR AND METHODS

(75) Inventors: David R. Pendleton, Fairfield, OH (US); James E. Kesterman, Cincinnati, OH (US); Kristopher A. Kane, Cincinnati, OH (US)

(73) Assignee: Delaware Capital Formation, Inc., Wilmington, DE (US)

( * ) Notice: Subject to any disclaimer, the term of this patent is extended or adjusted under 35 U.S.C. 154(b) by 145 days.

This patent is subject to a terminal disclaimer.

(21) Appl. No.: 10/836,783

(22) Filed: Apr. 30, 2004

(65) Prior Publication Data

US 2005/0241695 A1    Nov. 3, 2005

(51) Int. Cl.
*F16K 31/18*    (2006.01)
(52) U.S. Cl. .................. 137/448; 137/445; 137/15.18; 141/198; 285/404
(58) Field of Classification Search ............... 137/448, 137/434, 445, 410, 416, 15.18, 15.26; 141/198, 141/59, 205, 213; 285/404
See application file for complete search history.

(56) References Cited

U.S. PATENT DOCUMENTS

| | | |
|---|---|---|
| 979,819 A | 12/1910 | Anderson |
| 1,219,222 A | 3/1917 | Baxter et al. |
| 1,246,033 A | 11/1917 | Adams |
| 1,268,947 A | 6/1918 | Fell |
| 1,289,490 A | 12/1918 | Lundstrom |
| 1,313,386 A | 8/1919 | Jones |
| 1,689,066 A | 10/1928 | Baxter |
| 2,340,936 A | 2/1944 | Cook |
| 2,499,409 A | 3/1950 | Norway |
| 2,507,545 A | 5/1950 | Samiran |
| 2,685,891 A | 8/1954 | Segelhorst et al. |
| 2,811,179 A | 10/1957 | Greenwood |
| 2,839,082 A | 6/1958 | Moore et al. |

(Continued)

FOREIGN PATENT DOCUMENTS

DE    1750504 A1    8/1971

(Continued)

OTHER PUBLICATIONS

*OPW Instructions*—Assembly and Installation Instructions for OPW 61-SO and 61-SOM Carb Required Overfill Prevention Valves; pp. 1-11; Jan. 1993.

(Continued)

*Primary Examiner*—Eric Keasel
*Assistant Examiner*—Craig Schneider
(74) *Attorney, Agent, or Firm*—Dinsmore & Shohl LLP

(57) ABSTRACT

Drop tube segments are provided. Each drop tube segment may be attached to another drop tube segment of a drop tube assembly. The drop tube segments include a wall with a fastener receiving structure that is devoid of any opening extending between inner and outer surfaces of the wall. Methods of making a drop tube assembly are also provided. The methods include the step of inserting a second end portion of a first conduit over a first end portion of a second conduit while edges of an aperture extend radially outwardly away from an outer surface of a first wall of the first conduit.

15 Claims, 13 Drawing Sheets

U.S. PATENT DOCUMENTS

| | | | |
|---|---|---|---|
| 2,918,931 | A | 12/1959 | Siri |
| 2,918,932 | A | 12/1959 | Few |
| 3,078,867 | A | 2/1963 | McGillis et al. |
| 3,610,273 | A | 10/1971 | Russell |
| 3,661,175 | A | 5/1972 | Tillman |
| 3,791,407 | A | 2/1974 | Nicholls |
| 3,794,077 | A | 2/1974 | Fanshier |
| 3,963,041 | A | 6/1976 | McGillis |
| 4,308,894 | A | 1/1982 | Carpentier |
| 4,479,669 | A | 10/1984 | Hynes |
| 4,667,711 | A | 5/1987 | Draft |
| 4,793,387 | A | 12/1988 | LeBlanc et al. |
| 4,896,705 | A | 1/1990 | Podgers et al. |
| 4,986,320 | A | 1/1991 | Kesterman et al. |
| 4,998,571 | A * | 3/1991 | Blue et al. ............... 141/198 |
| 5,086,843 | A | 2/1992 | Mims et al. |
| 5,117,877 | A | 6/1992 | Sharp |
| 5,152,315 | A * | 10/1992 | Lagache ............... 137/448 |
| 5,163,470 | A * | 11/1992 | Maeshiba ............... 137/448 |
| 5,174,345 | A * | 12/1992 | Kesterman et al. ...... 141/198 |
| 5,207,241 | A * | 5/1993 | Babb ............... 141/198 |
| 5,241,983 | A | 9/1993 | Lagache |
| 5,398,735 | A * | 3/1995 | Lagache ............... 141/95 |
| 5,522,415 | A | 6/1996 | Hopenfeld |
| 5,564,464 | A | 10/1996 | Pendleton et al. |
| 5,564,465 | A | 10/1996 | Pettesch |
| 5,655,565 | A | 8/1997 | Phillips et al. |
| 5,839,465 | A | 11/1998 | Phillips et al. |
| 5,887,614 | A | 3/1999 | Weeks et al. |
| 6,138,707 | A * | 10/2000 | Stuart ............... 137/202 |
| 6,206,056 | B1 * | 3/2001 | Lagache ............... 141/198 |
| 6,267,156 | B1 | 7/2001 | Argandona |
| 6,318,421 | B1 | 11/2001 | Lagache |
| 6,523,564 | B1 | 2/2003 | Phillips |
| 6,523,581 | B2 | 2/2003 | Pendleton et al. |
| 6,536,465 | B2 | 3/2003 | David et al. |
| 6,655,418 | B1 | 12/2003 | McGill et al. |
| 6,669,413 | B1 | 12/2003 | Neeld et al. |
| 6,874,528 | B2 | 4/2005 | Kozik et al. |
| 6,913,047 | B1 * | 7/2005 | Kane et al. ............... 141/198 |
| 2002/0179178 | A1 | 12/2002 | Pendleton et al. |
| 2004/0017081 | A1 | 1/2004 | Simpson et al. |
| 2005/0241696 | A1 * | 11/2005 | Kane et al. ............... 137/448 |
| 2005/0241722 | A1 * | 11/2005 | Pendleton et al. ............ 141/18 |
| 2005/0241723 | A1 | 11/2005 | Pendleton et al. |
| 2005/0254910 | A1 | 11/2005 | Kane et al. |

FOREIGN PATENT DOCUMENTS

| | | |
|---|---|---|
| DE | 8802675 | 4/1988 |
| DE | 8805087 U1 | 6/1988 |
| DE | 19941820 C1 | 2/2001 |
| EP | 0437142 | 7/1991 |
| FR | 1360869 | 4/1964 |
| FR | 1377087 A | 10/1964 |
| FR | 1526790 A | 5/1968 |
| FR | 219716 A1 | 3/1974 |
| FR | 2194908 A | 3/1974 |
| FR | 2205166 | 5/1974 |
| FR | 2270198 | 12/1975 |
| FR | 2331732 | 6/1977 |
| FR | 2355736 | 1/1978 |
| GB | 0966842 A | 8/1964 |
| GB | 1222364 | 2/1971 |
| GB | 1444260 | 7/1976 |
| GB | 1531083 | 1/1978 |
| GB | 2064041 A | 6/1981 |
| GB | 2309767 A | 8/1997 |

OTHER PUBLICATIONS

*Polymod® Elastomer Sealing Materials*, Chris M.A. Chilson, Jun. 15, 2000.
*Parker Total Sealing Systems*, Parker Seal Group, Irvine, CA, 1989.
*Parker PolyPak Seals*.
European Search Report for App. No. 05009178 dated Jul. 27, 2005.

* cited by examiner

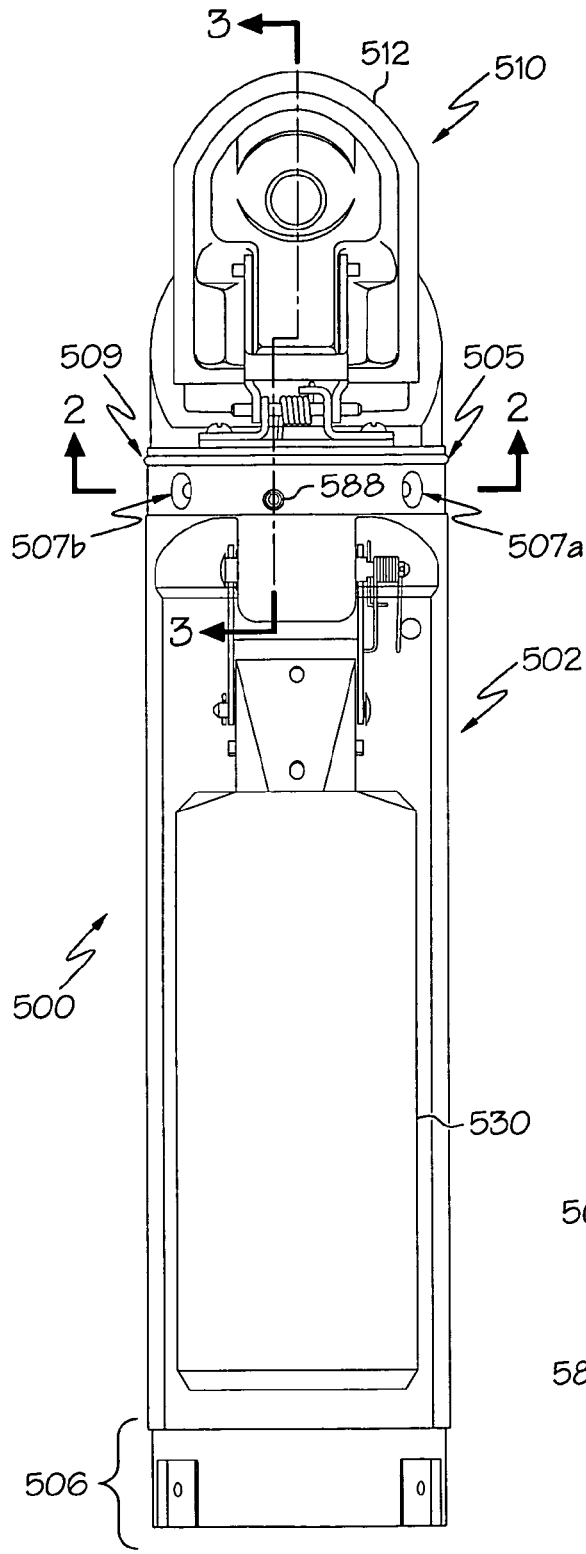
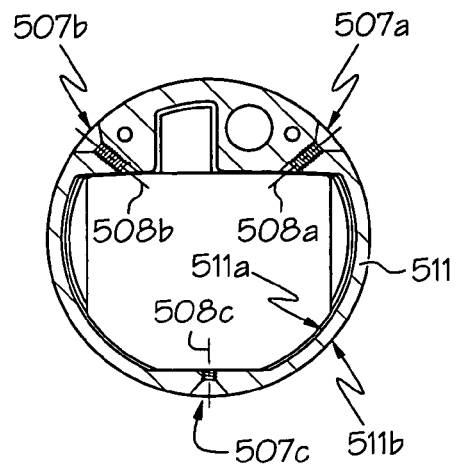
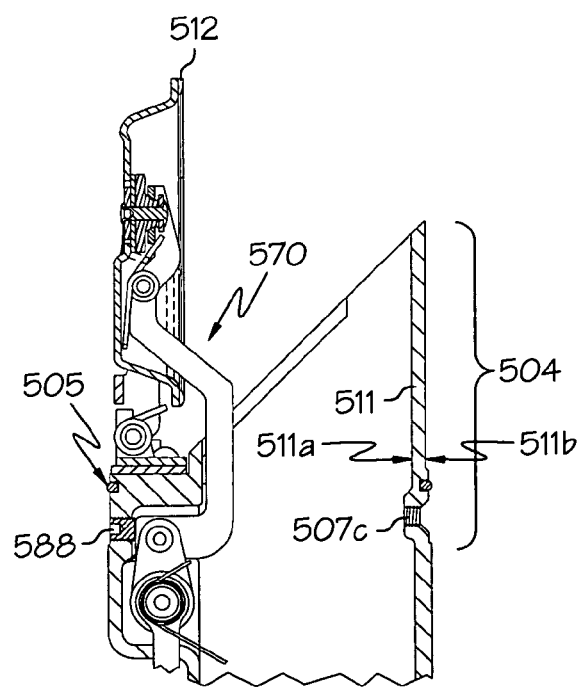
FIG. 1 (PRIOR ART)
FIG. 2 (PRIOR ART)
FIG. 3 (PRIOR ART)

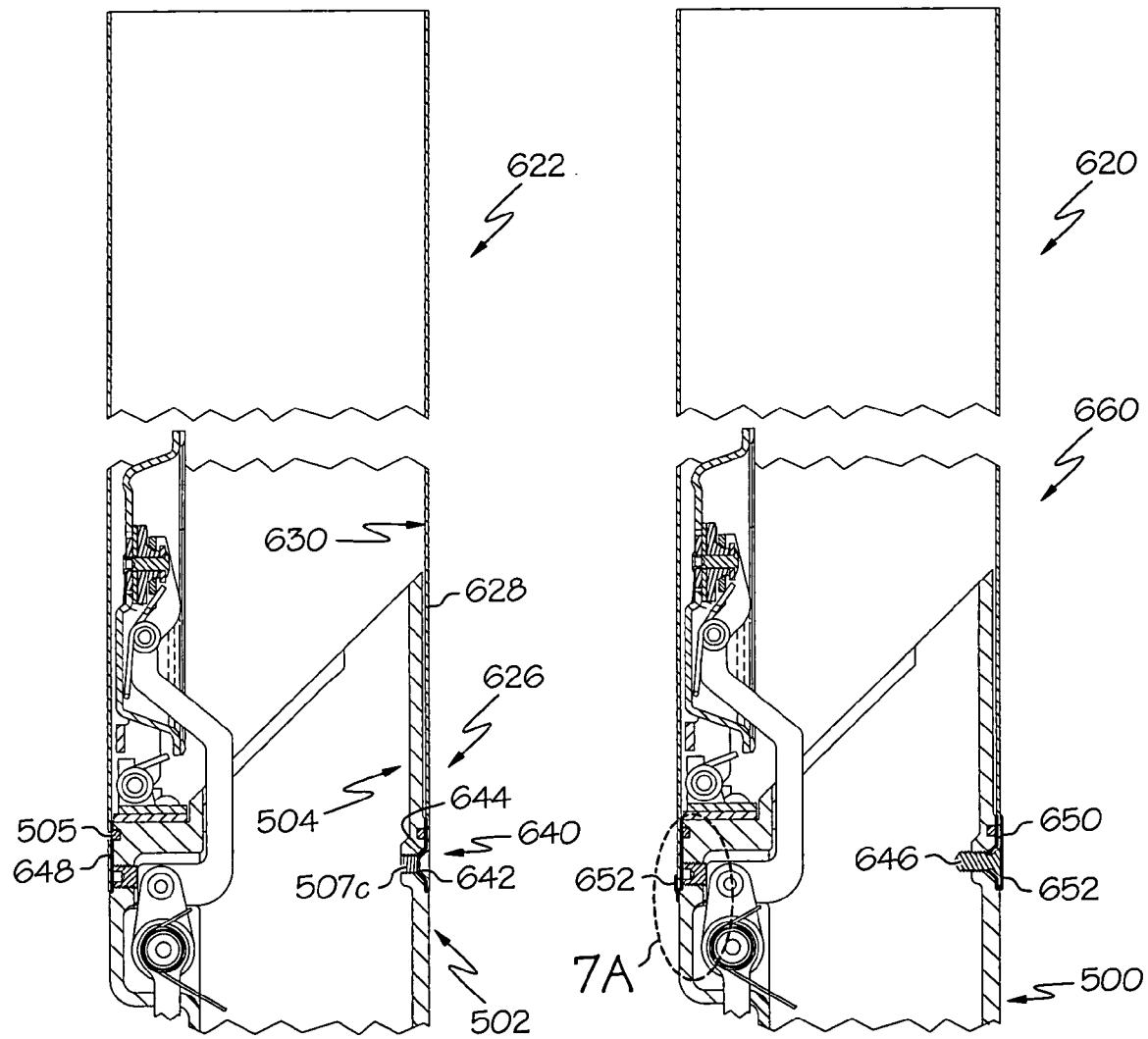

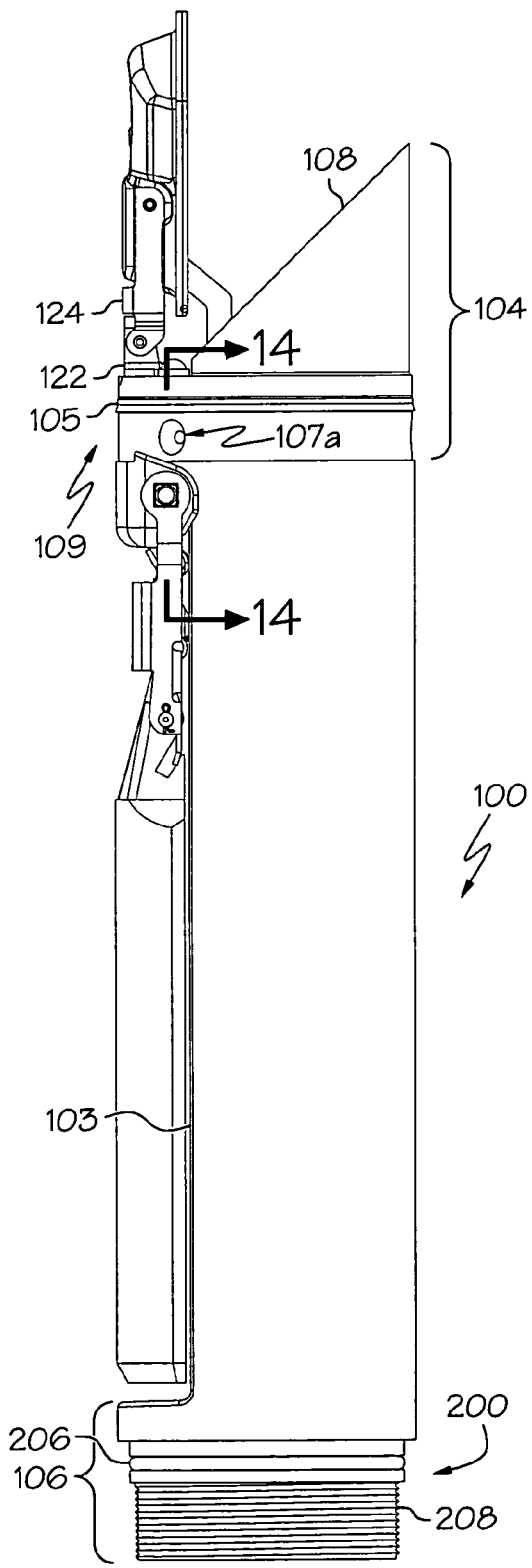
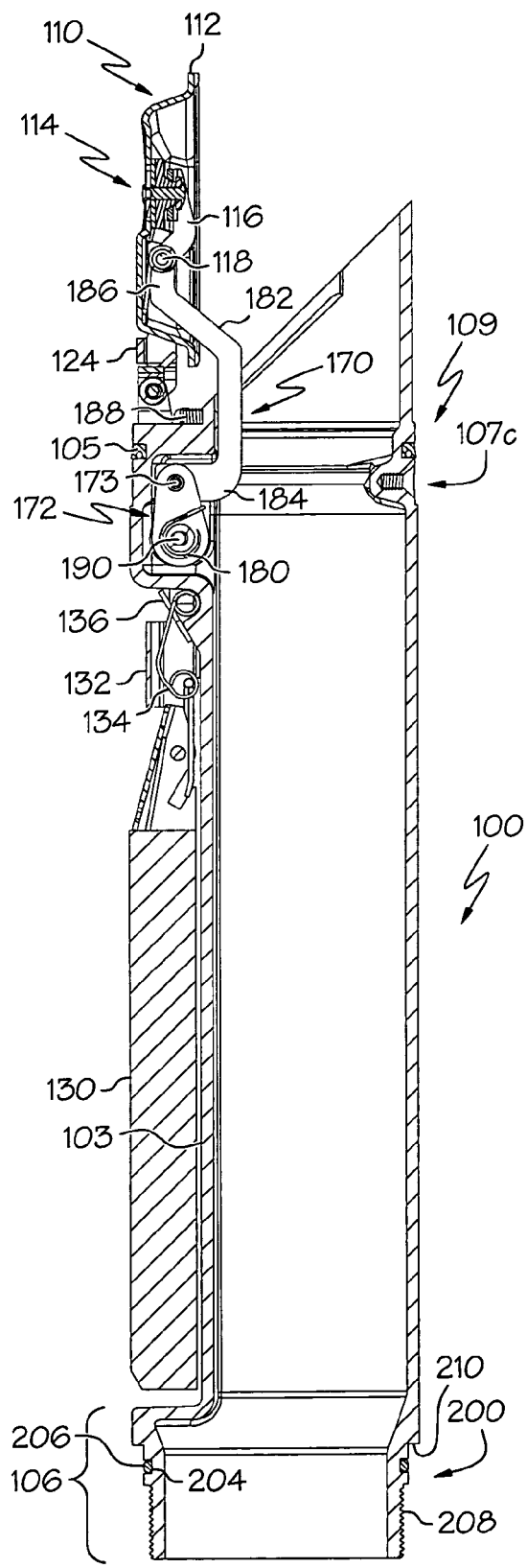
FIG. 12
FIG. 13

DROP TUBE SEGMENTS ADAPTED FOR USE WITH A LIQUID RESERVOIR AND METHODS

TECHNICAL FIELD

The present invention relates generally to drop tube segments and methods, and more particularly to drop tube segments adapted for use with a liquid reservoir and methods of making drop tube assemblies.

BACKGROUND OF THE INVENTION

Our increasingly mobile and mechanized society uses a variety of different fuels (e.g., gasoline, diesel fuel, ethanol, etc.) as energy. Liquid fuels are generally stored in liquid reservoirs such as underground storage tanks, above ground tanks, or any of a variety of different containers. Typically, liquid fuel reservoirs have inlets and outlets through which fuel can be added to and/or removed from the reservoir. These inlets and outlets may typically consist of a riser pipe extending from the reservoir. Internal to the riser pipe is a drop tube that typically includes an overfill valve adapted to respond once a predetermined level is reached in the liquid reservoir. To simplify manufacture and assembly, it is also known to provided the drop tube in a plurality of segments that are fastened together in series to form an overall drop tube assembly. As shown in U.S. Pat. No. 4,986,320, for example, the drop tube assembly includes an intermediate drop tube segment having opposed ends that are each correspondingly fastened to an upper and lower drop tube segment with fasteners extending through the respective walls of the segments.

Such configurations have proven to be very effective. To further enhance the beneficial nature of previous drop tube assemblies, there is a desire to provide a substantially fluid tight seal at the fastening location between the drop tube segments. A fluid tight seal may reduce or prevent fluid, such as vapor, from being released from the ullage area of the reservoir to the interior of the drop tube that might act as a chimney to vent the fluid to the surrounding atmosphere and potentially create an environmental concern.

To address potential concerns of vapor leakage, it is known to provide fastening sections with an epoxy layer to provide a fluid-tight seal at potential leak points. For example, it is known to provide a drop tube assembly, as shown in U.S. Pat. No. 4,986,320, with a conventional drop tube segment 500 described with respect to FIGS. 1–7 and 7A of the drawings herein. As shown in FIG. 4, the conventional drop tube segment 500 may include a fastening section 509 adapted to facilitate attachment between the drop tube segment 500 and another conventional drop tube segment that can be arranged as an upper drop tube segment 620. As shown in FIG. 7, the conventional drop tube segment 500 can be attached to the conventional upper drop tube segment 620 to form a conventional drop tube assembly 660. As described more fully below, the conventional fastening arrangement includes an epoxy layer, such as a layer of Loctite® epoxy-sealant for use as a cold weld bonding compound.

As shown in FIG. 1, the conventional drop tube segment 500 includes a conduit 502 with a first end portion 504 (see FIG. 3) and a second end portion 506. The first end portion 504 includes a wall 511 with an inner surface 511a and an outer surface 511b. Three fastener receiving structures 507a, 507b, 507c are radially disposed on the wall 511. In addition, each fastener receiving structure 507a, 507b, 507c comprises an opening that extends between the inner surface 511a and the outer surface 511b of the wall 511, along respective corresponding axes 508a, 508b, 508c, such that the openings comprise through openings that might permit fluid communication between the inner surface 511a and the outer surface 511b.

The drop tube segment 500 further includes a valve assembly 510 with a valve member 512 pivotally associated with the first end portion 504 of the conduit 502. The valve assembly 510 further includes a float 530 and a linkage device 570 pivotally connected with the valve member 512 and in communication with the float 530 wherein the float 530 may facilitate in adjusting position of the valve member 512 with respect to the first end portion 504 in response to a liquid level in a liquid reservoir. As shown in FIGS. 1 and 3, the drop tube segment 500 is also known to include a conventional adjustable stop member 588 located below an O-ring sealing member 505 and adapted to engage the linkage device 570, as shown in FIG. 3, to limit a movement of the linkage device 570.

A conventional method of making a conventional drop tube assembly will now be described with respect to FIGS. 4–7 and 7A. As shown in FIG. 4, the previously-mentioned upper drop tube segment 620 is provided with an upper conduit 622 with a first end portion 624 and a second end portion 626. The upper conduit 622 includes a wall 628 with an inner surface 630 and an outer surface 631. An aperture 640 is formed in the wall 628 (e.g., by a drilling or a punching process) from the outer surface 631 to the inner surface 630. Due to the inwardly-directed forces present when forming the aperture 640, edges 642 of the aperture 640 may extend radially inwardly from the inner surface 630 of the wall 628 and/or burrs formed while making the aperture 640 may extend radially inwardly from the inner surface 630 of the wall 628.

As shown in FIG. 5, the second end portion 626 of the upper conduit 622 is inserted over the first end portion 504 of the conduit 502. As the aperture 640 passes over the sealing member 505, the outer edges 642 and/or burrs associated with the aperture 640 may damage the sealing member 505, for example, by gouging the sealing member 505 with the outer edges 642 and/or burrs associated with the aperture 640. Gouging of the sealing member 505 may form one or more grooves or other imperfections in the outer circumferential surface of the sealing member 505. In order to maintain a fluid tight connection with a seal including such surface imperfections, an epoxy layer 648 may be applied to the outer surface 511b of the wall 511 prior to insertion of the second end portion 626 of the upper conduit 622 over the first end portion 504 of the conduit 502.

As shown in FIG. 6, once the second end portion 626 of the upper conduit 622 is inserted over the first end portion 504 of the conduit 502, a stamping tool may be used to shape the aperture 640 adjacent the inner surface 630 of the wall 628 such that the edges 642 of the aperture 640 extend radially inwardly, or further radially inwardly, from the inner surface 630 of the wall 628. Shaping of the aperture also causes crimped portions 644 of the wall 628 adjacent the aperture 640 to at least partially enter the corresponding fastener receiving structure 507a, 507b, 507c.

As shown in FIG. 7, after shaping the aperture 640, a fastener 646 may be inserted through the aperture 640 to engage the crimped portion 644 and a corresponding one of the fastener receiving structures 507a, 507b, 507c. The epoxy layer 648 may be effective to fill in any grooves and/or other imperfections in the outer circumferential surface of the sealing member 505 to provide a fluid tight seal between the drop tube segment 500 and the upper drop tube segment 620. Similarly, another epoxy layer 650 may be applied about the head of each fastener 646 associated with each fastener receiving structure 507a, 507b, 507c in order to provide a fluid tight seal at the fastener receiving structures 507a, 507b, 507c. Still further, as shown in FIG. 7A, a leak path may exist at the interface 588a between the adjustable stop member 588 and the wall 511. In order to provide a fluid tight seal, another epoxy layer 652 may be applied to a circumferential joint 629 between the upper conduit 622 and the conduit 502.

Application of an epoxy layer to provide fluid-tight sealing has proven very beneficial to reduce fluid vapor leakage. However, the addition of an epoxy layer typically greatly lengthens the installation process and the epoxy layer must cure for an extended period of time before the drop tube assembly may be installed with respect to the liquid reservoir. Currently, there is a need for drop tube assemblies that comprise a plurality of sections that may be connected together for immediate installation with respect to the liquid reservoir while providing a fluid seal at the fastening location between the drop tube segments.

SUMMARY OF THE INVENTION

Accordingly, it is an aspect of the present invention to obviate problems and shortcomings of conventional drop tube segments and methods of making drop tube assemblies. More particularly, it is an aspect of the present invention to provide a drop tube assembly that includes a fluid tight seal between portions of a first and second conduit to inhibit, such as prevent, fluid leakage to the surrounding atmosphere that might otherwise create an environmental concern. It is a further aspect of the present invention to provide a drop tube assembly with a fluid tight seal without necessarily requiring the use of an epoxy sealant that involves extensive curing time.

To achieve the foregoing and other aspects and in accordance with the present invention, a drop tube assembly is provided that is adapted for use with a liquid reservoir. The drop tube assembly comprises a first drop tube segment including a first conduit with first and second end portions. At least the second end portion of the first conduit includes a first wall with an inner surface. The drop tube assembly further includes a second drop tube segment with a second conduit including first and second end portions. At least the first end portion of the second conduit includes a second wall with inner and outer surfaces. The second end portion of the first conduit and the first end portion of the second conduit are attached together and at least portions of the first and second conduits cooperate to at least partially define a liquid flow path. The second conduit further includes a fastener receiving structure on the second wall, with the fastener receiving structure being devoid of any opening extending between the inner and outer surfaces of the second wall. The second drop tube segment further includes a valve assembly with a valve member associated with the first end portion of the second conduit. The valve assembly further includes a float and a linkage device pivotally connected with respect to the valve member and adapted for communication with the float such that the float may facilitate in adjusting the position of the valve member with respect to the first end portion of the second conduit in response to a liquid level in a liquid reservoir. The drop tube assembly further includes an interstitial space interposed between at least portions of the inner surface of the first wall and the outer surface of the second wall. The drop tube assembly also includes a fastener extending through the first wall and the interstitial space to engage the fastener receiving structure and to secure the first conduit relative to the second conduit. The drop tube assembly further includes a sealing member at least partially disposed between the first wall and the second wall. The sealing member is operative to inhibit fluid communication between the interstitial space and the liquid flow path.

To achieve further aspects and in accordance with the present invention, a drop tube assembly is provided that is adapted for use with a liquid reservoir. The drop tube assembly includes an upstream drop tube segment comprising an upstream conduit with first and second end portions. At least the second end portion of the upstream conduit includes a first wall with an inner surface. The drop tube assembly further includes a downstream drop tube segment with a downstream conduit including first and second end portions. At least the first end portion of the downstream conduit includes a second wall with inner and outer surfaces, wherein the second end portion of the upstream conduit and the first end portion of the downstream conduit are attached together. At least portions of the upstream and downstream conduits cooperate to at least partially define a liquid flow path with a substantial portion of the upstream conduit being positioned upstream of the downstream conduit. The downstream conduit further includes a fastener receiving structure on the second wall. The fastener receiving structure is devoid of any opening extending between the inner and outer surfaces of the second wall. The downstream drop tube segment further comprises a valve assembly with a valve member associated with the first end portion of the downstream conduit. The valve assembly further includes a float and a linkage device pivotally connected with respect to the valve member and adapted for communication with the float such that the float may facilitate in adjusting the position of the valve member with respect to the first end portion of the downstream conduit in response to a liquid level in a liquid reservoir. The drop tube assembly also includes a sealing member at least partially disposed between the first and second walls. The sealing member is disposed upstream of the fastener receiving structure. The drop tube assembly further includes a fastener extending through the first wall to engage the fastener receiving structure and to secure the upstream conduit relative to the downstream conduit.

To achieve additional aspects and in accordance with the present invention, a drop tube segment is provided and adapted to be attached to an upstream drop tube segment of a drop tube assembly for use with a liquid reservoir. The drop tube segment includes a conduit with first and second end portions. At least the first end portion of the conduit includes a wall with inner and outer surfaces. A fastener receiving structure is provided on the wall, with the fastener receiving structure being devoid of any opening extending between the inner and outer surfaces of the wall. The drop tube segment further includes a valve assembly with a valve member associated with the first end portion of the conduit. The valve assembly further includes a float and a linkage device pivotally connected with respect to the valve member and adapted for communication with the float such that the float may facilitate in adjusting the position of the valve member with respect to the first end portion of the conduit in response to a liquid level in a liquid reservoir. The drop tube segment further includes a sealing member at least partially disposed adjacent the wall such that the fastener receiving structure is positioned between the sealing member and the second end portion of the conduit.

To achieve still further aspects and in accordance with the present invention, a method of making a drop tube assembly is provided. The method includes the steps of providing a first drop tube segment with a first conduit including first and second end portions. At least the second end portion of the first conduit includes a first wall with an inner surface and an outer surface. The method also includes the step of providing a second drop tube segment with a second conduit including first and second end portions. At least the first end portion of the second conduit includes a second wall with inner and outer surfaces. The method further includes the steps of disposing a sealing member adjacent the outer surface of the second wall, providing a fastener, forming at least one aperture through the first wall, and shaping the aperture adjacent the inner surface of the first wall such that edges of the aperture extend radially outwardly away from the outer surface of the first wall. The second end portion of the first conduit is also inserted over the first end portion of the second conduit while the edges of the aperture extend radially outwardly away from the outer surface of the first wall such that the aperture passes over the sealing member to form an interstitial space between at least portions of the inner surface of the first wall and the outer surface of the second wall. Once inserted, at least portions of the first and second conduits cooperate to define a liquid flow path with the sealing member at least partially disposed between the first wall and the second wall. The sealing member is also operative to inhibit fluid communication between the interstitial space and the liquid flow path. The method further includes the step of attaching the first conduit to the second conduit by inserting the fastener through the aperture and the interstitial space to engage the second wall.

Advantages and novel features of the present invention will become apparent to those skilled in the art from the following detailed description, which simply illustrates various modes and examples contemplated for carrying out the invention. As will be realized, the invention is capable of other different aspects, all without departing from the invention. Accordingly, the drawings and descriptions are illustrative in nature and not restrictive.

BRIEF DESCRIPTION OF THE DRAWINGS

While the specification concludes with claims particularly pointing out and distinctly claiming the present invention, it is believed that the same will be better understood from the following description, taken in conjunction with the accompanying drawings, in which:

FIG. 1 is a front elevational view of a conventional drop tube segment;

FIG. 2 is a partial sectional view depicting certain portions of the conventional drop tube segment along line 2—2 of FIG. 1;

FIG. 3 is a sectional view of the conventional drop tube segment along line 3—3 of FIG. 1;

FIG. 6 illustrates a conventional first and second conduit after shaping an aperture formed through a first wall of the first conduit such that edges of the aperture extend radially inwardly from an inner surface of the first wall;

FIG. 7 illustrates a conventional first and second conduit after attaching the first conduit to the second conduit by inserting a fastener through the aperture formed through the first wall of the first conduit;

FIG. 12 is a right side elevational view of the drop tube segment of FIG. 8;

FIG. 13 is a sectional view of the drop tube segment along line 13—13 of FIG. 8;

DETAILED DESCRIPTION OF EXEMPLARY EMBODIMENTS

The various exemplary embodiments of the invention may be used to provide a valve system for a wide variety of applications. For example, the various exemplary embodiments of the invention may be used to provide overfill valve systems for use in a liquid reservoir, such as a liquid storage tank. In one particular example, features of the exemplary embodiments herein may be used in addition, or in place of, features disclosed in U.S. Pat. No. 4,986,320, which is herein incorporated entirely by reference. U.S. Pat. No. 4,986,320 is referred to throughout this application as "the referenced patent".

Figures 4, 5:
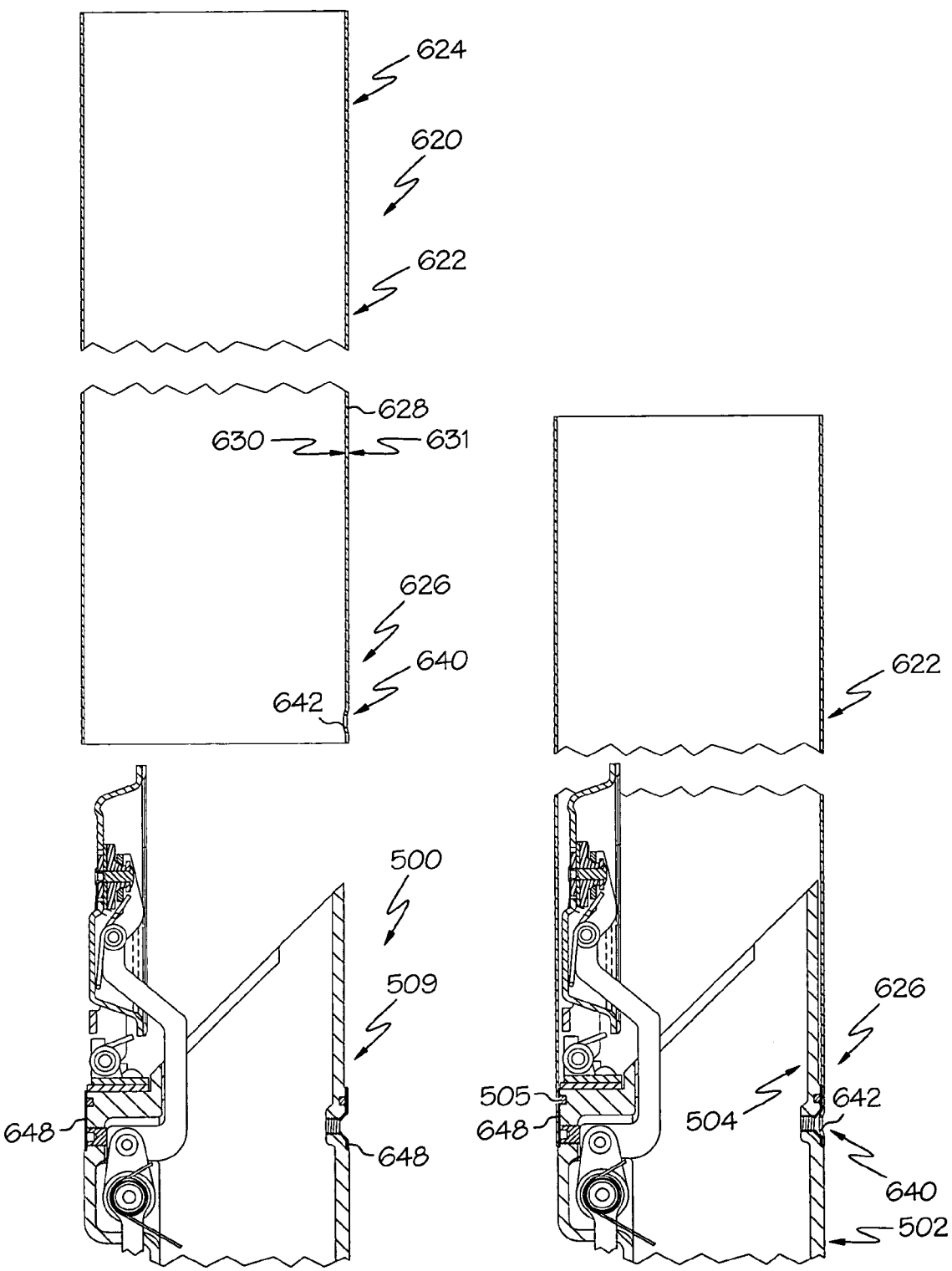
FIG. 4 illustrates a conventional first and second conduit prior to inserting a second end portion of the first conduit over a first end portion of the second conduit.
FIG. 5 illustrates a conventional first and second conduit after inserting a second end portion of the first conduit over a first end portion of the second conduit.
Figure 7A:
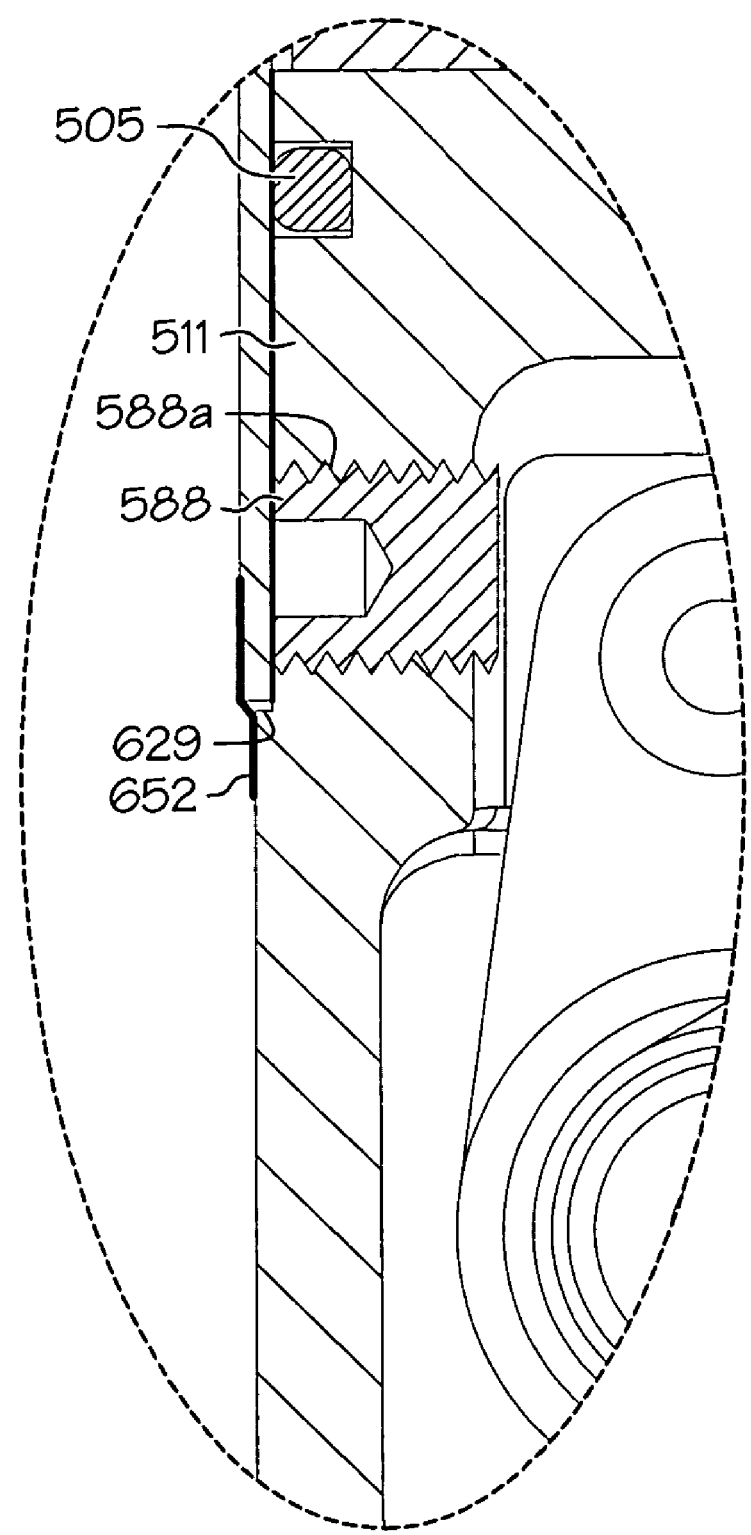
FIG. 7A is an enlarged view taken at view 7A of FIG. 7.
Figure 8:
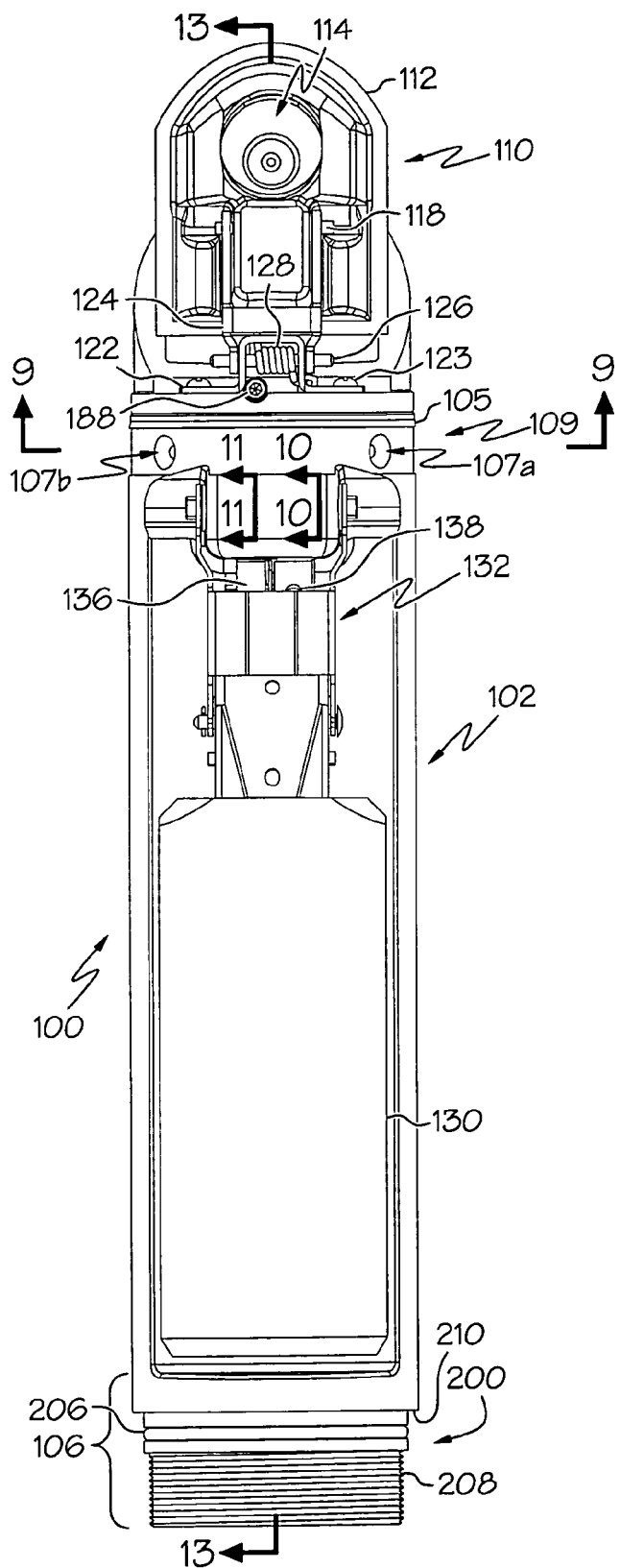
FIG. 8 is a front elevational view of a drop tube segment in accordance with one exemplary embodiment of the present invention.

Attention will now be directed to various exemplary embodiments of the invention. Concepts of exemplary embodiments are illustrated in the accompanying drawings, wherein like numerals indicate the same elements throughout the views. With reference to FIGS. 8, 12 and 13, a drop tube segment 100 in accordance with one embodiment of the present invention is disclosed. The drop tube segment 100 includes a conduit 102 with a first end portion 104 and a second end portion 106. The conduit 102 may be formed from a wide variety of materials and by various processes. In one exemplary embodiment, the conduit 102 may be formed from aluminum with a casting process. As shown, the exemplary conduit 102 can have a general cylindrical shape and may include a notched portion 103 to accommodate a float 130 as shown in FIGS. 12 and 13.

The drop tube segment 100 further includes a valve assembly, such as the exemplary valve assembly 110 illustrated and described herein. The concepts of the present invention can alternatively be used with various conventional valve assemblies. For example, general features and concepts of the conventional valve assembly described in the referenced patent may be incorporated in the drop tube segment 100 for use with the inventive concepts of the present invention.

As shown in FIGS. 8, 12, 13 and 17, the exemplary valve assembly 110 includes a one-piece mounting bracket 122 for attachment to the first end portion 104 of the conduit 102. As shown, a pair of screws 123 may be used to fasten the one-piece mounting bracket 122 to the first end portion 104. The valve assembly 110 further includes a valve member 112. As shown, the one-piece mounting bracket 122 is used to associate the valve member 112 with the first end portion 104 of the conduit 102. The one-piece mounting bracket 122 facilitates pivotal association between the valve member 112 and the first end portion 104 such that the valve member 112 may pivot to engage a valve seat 108 of the conduit 102. An H-shaped pivot link 124 may also be used to pivotally associate the valve member 112 with respect to the first end portion 104. As shown, one end portion of the H-shaped pivot link 124 may be pivotally attached to the valve member 112 with a shaft 118 while the other end portion of the H-shaped pivot link 124 may be pivotally attached to the one-piece mounting bracket 122 with another shaft 126. A torsion spring 128 is adapted to bias the valve member 112 out of a closed position against the valve seat 108.

Figure 17:
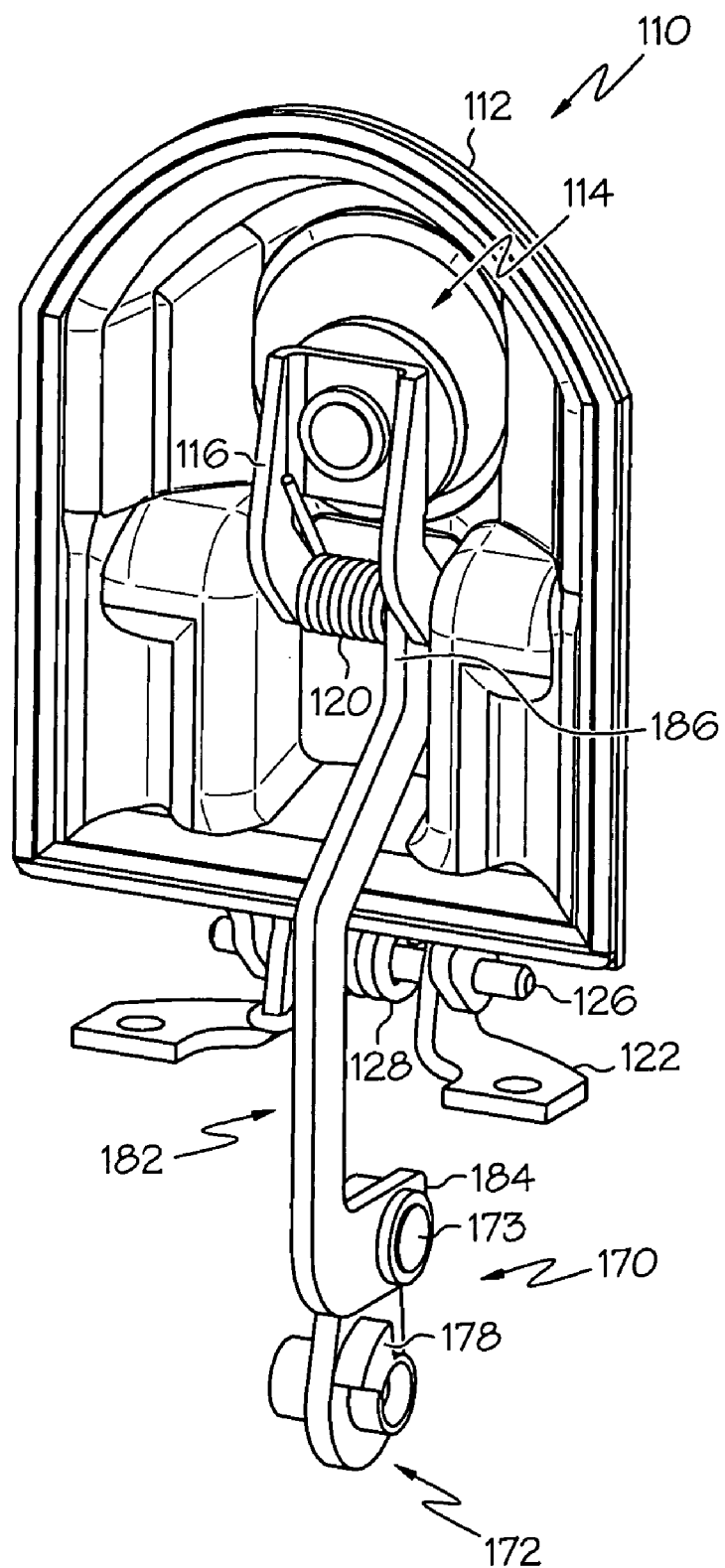
FIG. 17 illustrates a perspective view of the valve member and linkage device from the drop tube segment of FIG. 8.
Figure 18:
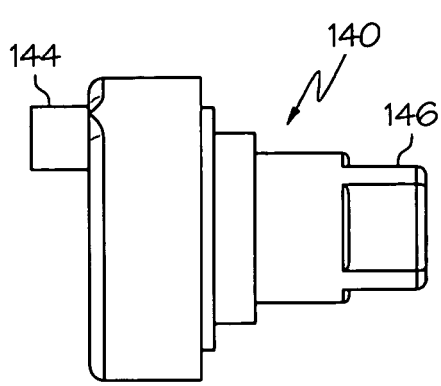
FIG. 18 illustrates a front elevational view of a driver member from the drop tube assembly of FIG. 8.
Figure 19:
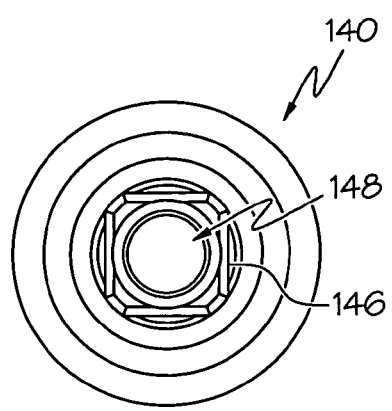
FIG. 19 illustrates a right side elevational view of the driver member of FIG. 18.
Figure 20:
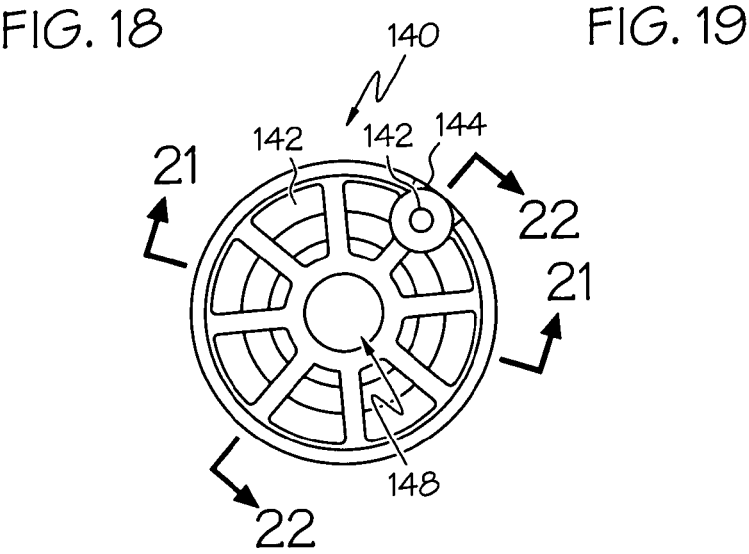
FIG. 20 illustrates a left side elevational view of the driver member of FIG. 18.
Figure 21:
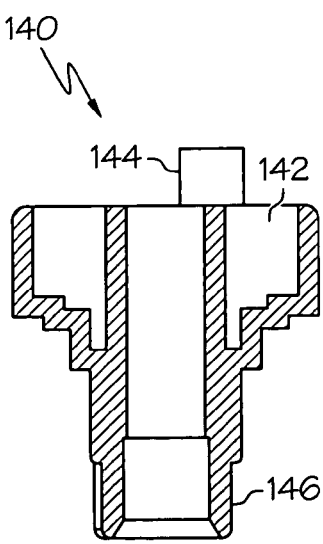
FIG. 21 illustrates a sectional view of the driver member along line 21—21 of FIG. 20.
Figure 22:
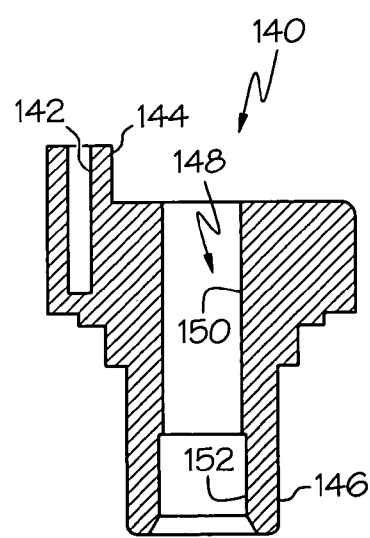
FIG. 22 is a sectional view of the driver member along line 22—22 of FIG. 20.

The valve member 112 can also be provided with a poppet valve 114 similar to the valve member and poppet valve disclosed in the reference patent. The poppet valve 114 includes a pivot link 116 and is provided with a torsion spring 120 to bias the poppet valve 114 to a closed position as shown in FIG. 17. The shaft 118 is also adapted to pivotally attach the poppet valve 114 to the valve member 112.

Figure 14:
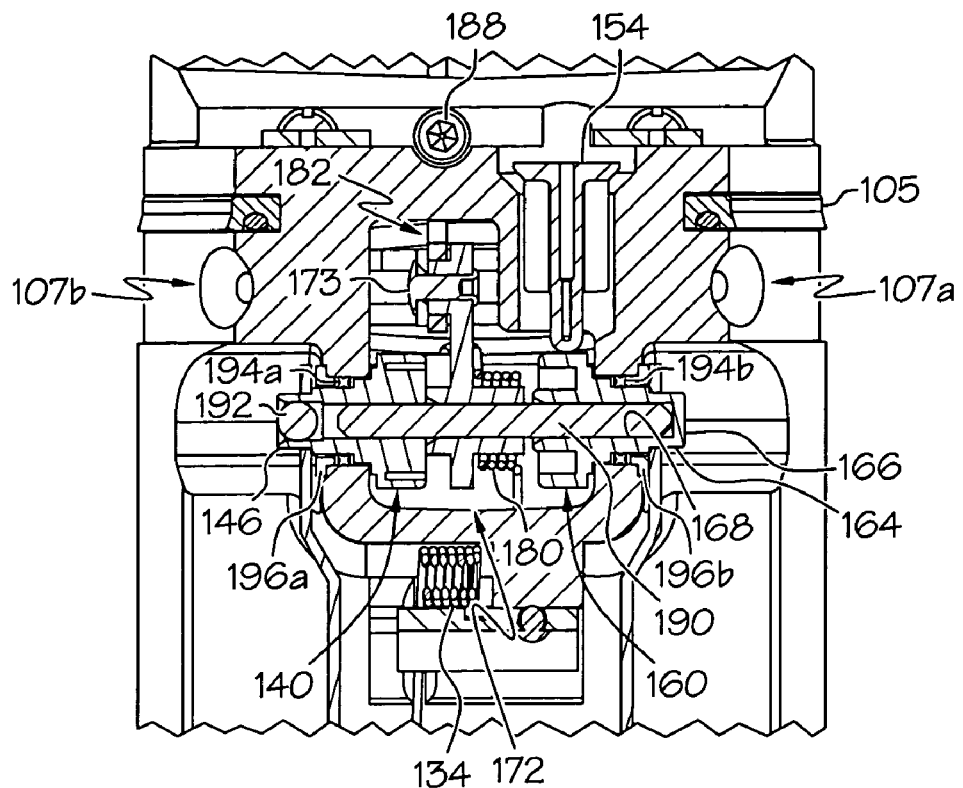
FIG. 14 is a sectional view of the drop tube segment along line 14—14 of FIG. 12.

As illustrated in FIGS. 13 and 17, the valve assembly 110 further includes a linkage device 170 that is pivotally connected with respect to the valve member 112 and adapted for communication with the float 130 such that the float may facilitate in adjusting the position of the valve member 112 with respect to the first end portion 104 of the conduit 102 in response to a liquid level in a liquid reservoir 300. The linkage device 170 can include a first link 172 and a second link 182. The second link 182 includes a first end portion 184 attached to the first link 172 with a pivot pin 173 and a second end portion 186 attached to the valve member 112 with the shaft 118. As shown in FIG. 14, the first link 172 is also rotatably mounted with respect to the conduit 102 with a shaft 190.

The linkage device 170 is further provided with a torsion spring 180 for biasing the valve member 112 to the open position illustrated in FIGS. 8, 12 and 13. As shown, an adjustable stop member 188 may also be provided to limit movement of the second link 182. As discussed in the referenced patent, it may be desirable to position the adjustable stop member 188 such that the pivot pin 173 is located off-center with respect to the shaft 190. For example, as shown in FIG. 13, the pivot pin 173 is permitted to rotate sufficiently counter clockwise such that it is located in an off-center position with respect to the shaft 190. The off-center position effectively locks the valve member 112 in the open position to resist movement in response to a downward force applied to the valve member 112.

The valve assembly 110 further includes the previously-mentioned float 130 that facilitates adjustment of the position of the valve member 112 with respect to the first end portion 104 of the conduit 102 in response to a liquid level in the liquid reservoir 300. As shown in FIG. 13, the float 130 may be biased outwardly by a biasing spring 134. The biasing spring 134 may press against a float link 132 to initially bias the float 130 into the angular position illustrated in FIG. 27. Biasing the float 130 to an initial angular position increases the lever angle of the float 130 to allow a reliable response to a predetermined liquid level in the liquid reservoir that might not otherwise occur if the float 130 is retracted within the notch portion 103 of the conduit 102. As shown in FIG. 8, a spring retainer 136 may be fastened to the conduit 102 with a fastener 138 to position the biasing spring 134 with respect to the conduit 102.

Figure 15:
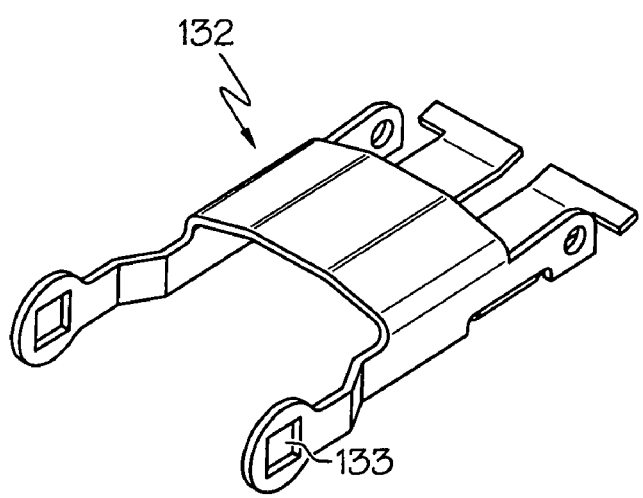
FIG. 15 is a perspective view of the float link of the drop tube segment of FIG. 8.

The float 130 may comprise an elongated body molded from any suitable material and may further include the previously-mentioned float link 132 designed to act as a safety link to provide a failure point to prevent otherwise expensive damage that might occur if the float 130 is forced to an over-pivoted position. As shown in FIG. 15, the float link 132 includes a pair of noncircular apertures 133 adapted to engage pivot bearings of the drop tube segment 100. In one illustrated exemplary embodiment, the pivot bearings can include a driver member 140 and/or a cam member 160. A wide variety of driver members and/or cam members may be used with the concepts of the present invention. In one exemplary embodiment, the driver member and/or cam member disclosed in the referenced patent may be used with the concepts of the present invention. Further examples of driver members and/or cam members that can be used with the concepts of the present invention are described with reference to FIGS. 14, 16 and 18–22. As shown, the driver member 140 and the cam member 160 are each adapted to nonrotatably engage a corresponding one of the noncircular apertures 133 of the float link 132 such that a pivoting movement of the float 130 causes a corresponding rotational movement of each of the driver member 140 and the cam member 160 about a pivot axis.

Figure 11:
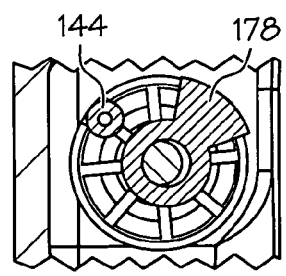
FIG. 11 is a sectional view of the drop tube segment along line 11—11 of FIG. 8, illustrating portions of an exemplary driver member and linkage device.

As shown in FIGS. 18–22, the driver member 140 can include a noncircular coupling extension 146 having a shape for cooperation with one of the noncircular apertures 133 of the float link 132 to be nonrotatably received therein. The driver member 140 further includes a drive pin 144 that is offset from a rotational axis of the driver member 140. The drive pin 144 is adapted to engage an extension 178 of the linkage device 170 (see FIGS. 11 and 17) when the float 130 sufficiently pivots relative to the conduit 102 in a manner similar to the arrangement disclosed in the referenced patent. The driver member 140 further includes a through aperture 148 with a first portion 150 adapted to receive a portion of the shaft 190 and a second portion 152 adapted to receive a closure member 192 as shown in FIG. 14. The closure member 192 and the driver member 140 might be formed from stainless steel, aluminum, plastics, rubbers, or other material that has the ability to provide sufficient corrosion resistance when exposed to fluid used in association with the liquid reservoir. In one particular embodiment, the closure member 192 may comprise stainless steel to provide a press-fit closure. In another example, the driver member 140 may comprise a Celcon or BASF material to further provide wear resistance. The driver member 140 may also include a plurality of hollow areas 142 to provide a substantially constant wall thickness to facilitate formation of the driver member 140 by an injection molding process.

Figure 10:
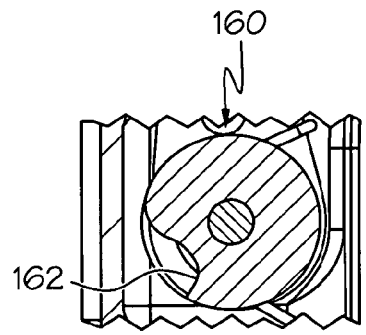
FIG. 10 is a sectional view of the drop tube segment along line 10—10 of FIG. 8, illustrating portions of an exemplary cam member.
Figure 16:
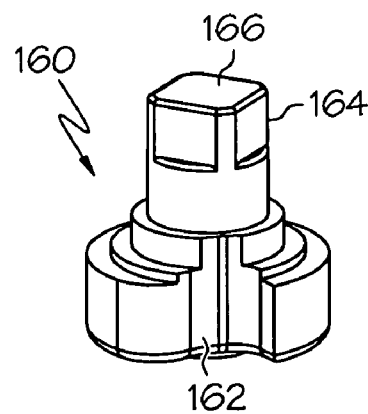
FIG. 16 illustrates a perspective view of the cam member from the drop tube segment of FIG. 8.

An exemplary cam member 160 is shown in FIGS. 10, 14 and 16 and can be formed from the same or similar material used to form the driver member 140 discussed above. The cam member 160 includes a noncircular coupling extension 164 having a shape for cooperation with one of the noncircular apertures 133 of the float link 132 to be nonrotatably received therein. The cam member 160 further includes a cam surface 162 adapted to control the position of a poppet valve 154 in a manner similar to the poppet valve disclosed in the referenced patent. As shown in FIG. 14, the cam member 160 may further include an aperture 168 with an integrally closed end 166. The aperture 168 is designed to receive a portion of the shaft 190, prevent fluid leakage between the shaft 190 and the cam member 160 and trap the shaft 190 between the integrally closed end 166 of the aperture 168 and the closure member 192 received by the driver member 140.

As further illustrated in FIG. 14, the drop tube segment 100 may be provided with a sealing member 194a, such as a quad ring sealing member, between the driver member 140 and the conduit 102. Similarly, another sealing member 194b, such as a quad ring sealing member, may be provided between the cam member 160 and the conduit 102. The sealing members 194a, 194b may be beneficial to inhibit, such as prevent, fluid leakage from the interior of the drop tube segment 100. Respective retainers 196a, 196b may also be provided to trap the sealing members 194a, 194b into position while also provide a bearing surface for the float link 132. As shown, the retainers 196a, 196b may have an extension for press fitting into corresponding apertures in the conduit 102.

Figure 27:
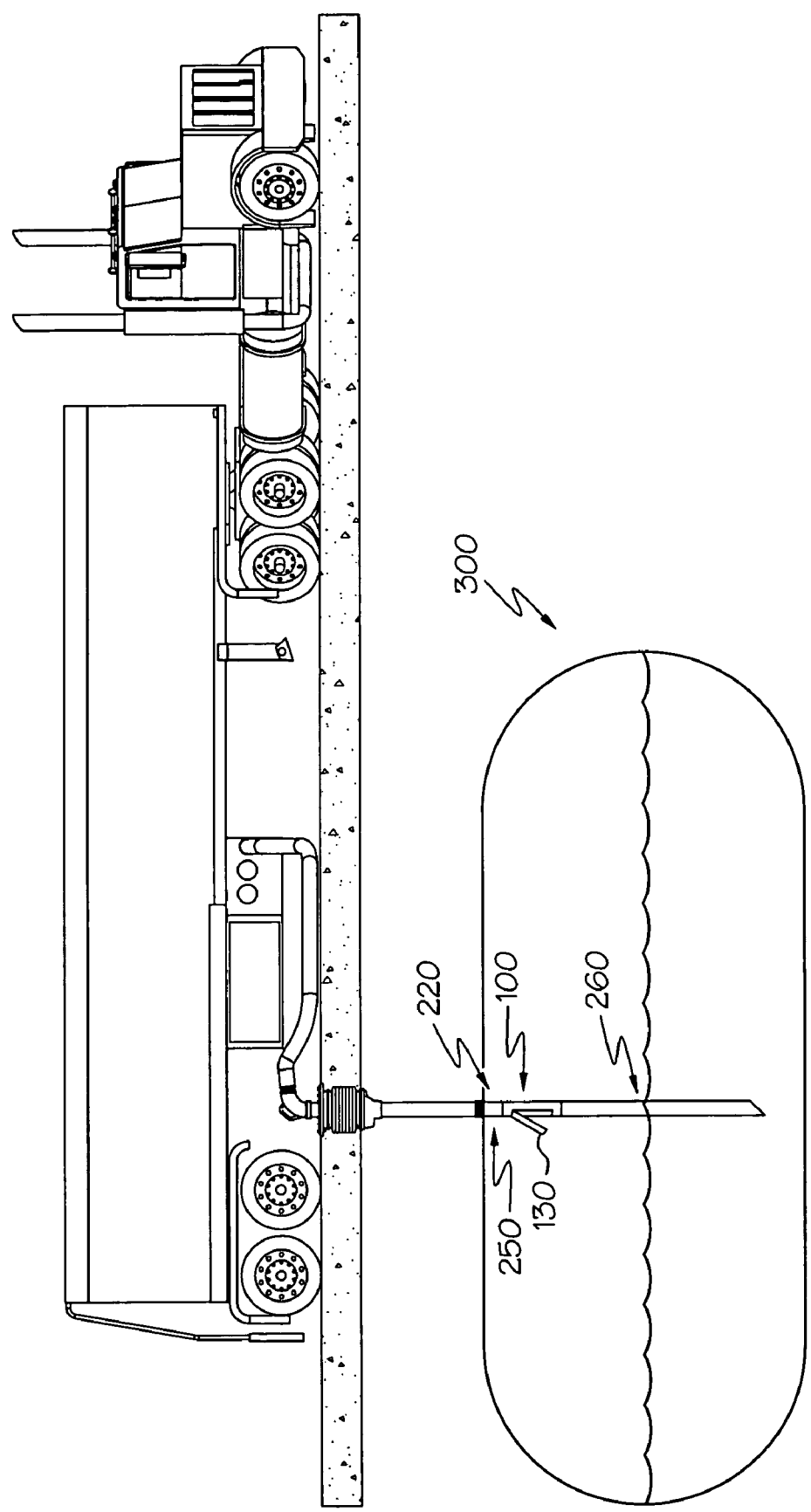
FIG. 27 illustrates an exemplary overfill valve system installed with respect to a liquid reservoir in accordance with the present invention.

The second end portion 106 of the conduit 102 may include a fastening section 200 adapted to facilitate attachment between the drop tube segment 100 and another drop tube segment that may be arranged as a lower drop tube segment 260 as illustrated in FIG. 27. The fastening section 200 can further include a sealing member adapted to inhibit, such as prevent, fluid from leaking into the internal conduit area. Various alternative fastening sections may be used to attach the drop tube segment 100 to the lower drop tube segment 260. As shown in FIGS. 8, 12 and 13, the exemplary fastening section 200 includes a sealing surface for engaging a sealing member 206. For example, as shown, the fastening section 200 may comprise an optional groove 204 that includes the sealing surface (e.g., the base and/or one or more sides of the groove) wherein the sealing member 206 is at least partially disposed in the groove 204 to engage the sealing surface. As shown, the groove 204 can comprise an annular groove but might comprise other shapes depending on the particular application. The fastening section 200 may further include a threaded portion 208 including exterior threads adapted to engage interior threads of the lower drop tube segment 260 to facilitate fastening between the drop tube segment 100 and the lower drop tube segment 260. The fastening section 200 of the drop tube segment 100 may also include a shoulder 210 that can act as a registration stop to limit the extent to which the lower drop tube segment 260 may be threaded on the drop tube segment 100.

The first end portion 104 of the conduit 102 may include another fastening section 109 with an optional fastener receiving structure adapted to facilitate attachment between the drop tube segment 100 and another drop tube segment that may be arranged as an upper drop tube segment 220 as illustrated in FIG. 27. The upper drop tube segment 220 includes an upper conduit 222 with a first end portion 224 and a second end portion 226. At least the second end portion 226 includes a first wall 228 with an inner surface 230. In the illustrated embodiment, the first wall 228 includes a cylindrical wall wherein the upper conduit 222 comprises a tubular member with a substantially circular cross section. As further shown, the wall 228 may extend from the first end portion 224 to the second end portion 226.

Figure 26:
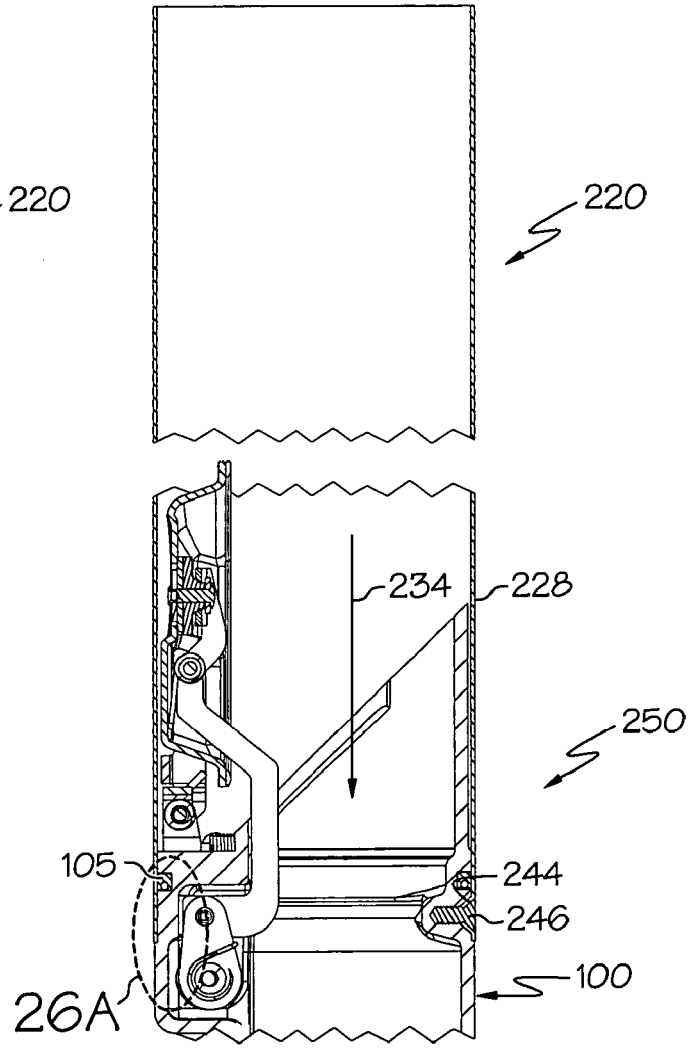
FIG. 26 illustrates a first and second conduit, in accordance with an exemplary embodiment of the present invention, after attaching the first conduit to the second conduit by inserting a fastener through the aperture formed through the first wall of the first conduit.
Figure 26A:
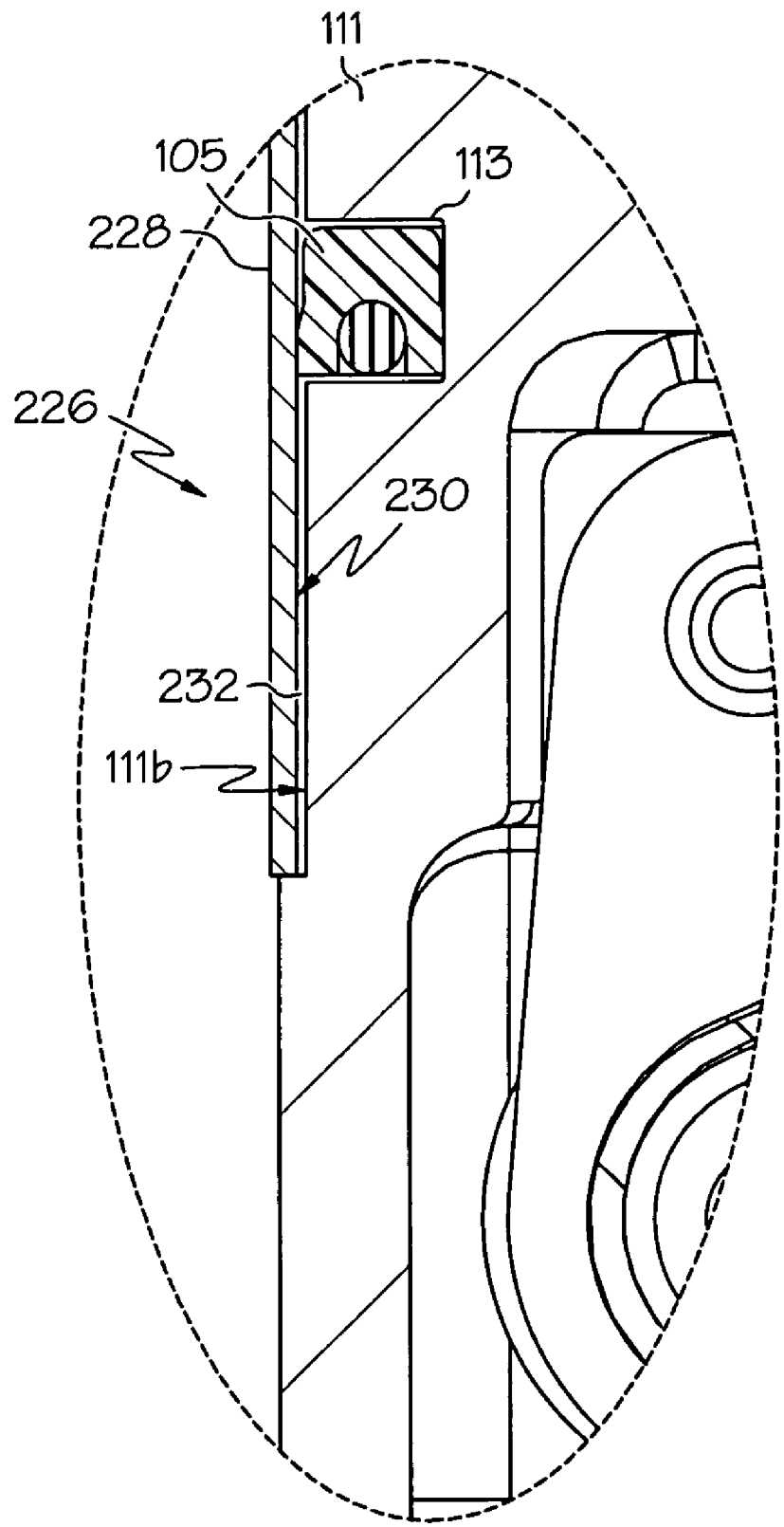
FIG. 26A is an enlarged view taken at view 26A of FIG. 26.

The second end portion 226 of the upper conduit 222 can be designed to be at least partially inserted over the first end portion 104 of the conduit 102 such that at least portions of the conduit 102 and the upper conduit 222 cooperate to at least partially define a liquid flow path 234. As shown in FIG. 26A, an interstitial space 232 may also be formed between portions of the inner surface 230 of the first wall 228 and portions of an outer surface 11b of a second wall 111 of the conduit 102. A sealing member 105 may also be provided that is operative to inhibit, such as prevent, fluid communication between the interstitial space 232 and the liquid flow path 234. Although a single sealing member 105 is described and illustrated herein, it is understood that the sealing member of exemplary embodiments might include a plurality of sealing members.

The sealing member 105 is at least partially disposed between the first wall 228 and the second wall 111. In additional applications, only a portion of the sealing member 105 might be disposed between the opposed wall surfaces with the remaining portions of the sealing member extending adjacent or outside of the space between the walls. In additional examples, the sealing member 105 is substantially disposed between the first wall 228 and the second wall 111. For instance, as shown, the sealing member 105 may be disposed in an optional groove 113 defined in the second wall 111 to facilitate location of the sealing member 105 with respect to the conduit 102. The illustrated groove 113 includes a base and two opposed sides. Further exemplary grooves of embodiments of the present invention, if provided, might alternatively comprise a variety of shapes designed to facilitate placement of a sealing member with respect to a fastening section. For example, although not shown, exemplary grooves might comprise a V-shaped groove, a rounded groove with an arcuate configuration, or other shapes.

Figure 9:
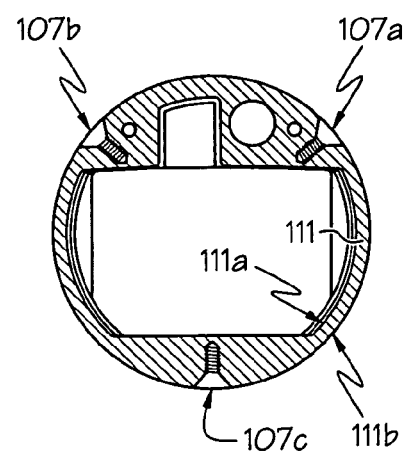
FIG. 9 is a sectional view depicting certain portions of the drop tube segment along line 9—9 of FIG. 8.

Once the drop tube segment 100 and upper drop tube segment 220 are properly positioned with respect to one another, a drop tube assembly 250 may be formed by attaching the drop tube segment 100 with the upper drop tube segment 220. In one example, one or more fasteners 246 may be provided to attach the upper drop tube segment 220 relative to the drop tube segment 100. While a single fastener may be used, exemplary embodiments can include a plurality of fasteners 246 that are equally or nonequally radially disposed about a periphery of the drop tube assembly 250. In the particular illustrated embodiment, three fasteners 246 are provided, wherein each fastener is associated with a corresponding one of three fastener recurring apertures 107a, 107b, 107c to substantially lock the relative position of the drop tube segments. As shown in FIG. 9, the fastener receiving apertures 107a, 107b, 107c may be radially disposed about a periphery of the drop tube assembly 250 such that the first and second fastener receiving apertures 107a, 107b are each radially disposed at 130 degrees to opposite sides of the third fastener receiving aperture 107c and radially disposed at 100 degrees relative to one another.

The one or more fasteners 246 may comprise a wide variety of structural elements to facilitate attachment between the drop tube segments. The fasteners, for example, might comprise a push nut, rivet, expanding fastener or other fastener structure. In the illustrated embodiment, the fastener comprises a screw that may be tightened to attach the drop tube segments together. As shown, each fastener 246 is designed to extend through an aperture 240 defined in the first wall 228 of the upper conduit 222 to engage the second wall 111 of the conduit 102. In one example, the fastener can engage a corresponding portion of the outer surface of the second wall 111 which is not particularly designed to receive a portion of the fastener. For example, the fastener may comprise a set screw that may be tightened such that an end portion of the set screw abuts a cylindrical portion of the second wall 11. Alternatively, the fastener 246 may engage a corresponding fastener receiving structure designed to receive a portion of the fastener 246. Providing a fastener receiving structure may be desirable to increase the strength of the joint between the drop tube segments.

A wide variety of fastener receiving structures may be provided on the second wall 111 in accordance with the present invention. For example, although not shown, certain embodiments of the present invention may include one or more fastener receiving structures that each include an opening that extends between an inner surface and an outer surface of the wall such that fluid communication might exist between the inner and outer surfaces. Alternatively, as shown in FIG. 9, fastener receiving structures 107a, 107b, 107c may be provided on the second wall 111 that are each devoid of any opening extending between an inner surface 111a and an outer surface 111b of the second wall 111. Indeed, as shown in FIG. 9, each fastener receiving structure 107a, 107b, 107c can include a cavity that extends within the outer surface 111b while preventing fluid communication from the outer surface 111b to the inner surface 111a that would otherwise occur if the openings extended between the inner and outer surfaces. Providing a fastener receiving structure that is devoid of any opening extending between an inner surface and an outer surface of the wall prevents leakage of fluid through the wall at the location of the fastener. Moreover, while any number and arrangement of fastener receiving structures may be provided, the illustrated fastening section 109 includes three fastener receiving structures 107a, 107b, 107c on the second wall 111 of the conduit 102 that are radially disposed about a periphery of the fastening section 109 and adapted for alignment with a corresponding one of the apertures 240 defined by the upper conduit 222. The fastener receiving structures 107a, 107b, 107c can have a wide variety of shapes and structures adapted to cooperate with the fastener 246 to facilitate attachment between the drop tube segments. As mentioned previously, the fastener receiving structures can comprise a cavity adapted to receive at least a portion of the fastener. The cavity, if provided, may have smooth surfaces or angled surfaces adapted to engage a rivet or expanding fastener. In the illustrated embodiment, the apertures are initially threaded to later receive a threaded portion of the fastener 246. In alternative embodiments, the apertures may be initially nonthreaded and threads may be later cut into the cavity wall by a threaded portion of a fastener as the fastener is tightened.

A method of making a drop tube assembly 250 will now be described with respect to FIGS. 23—26 and 26A. The method includes the steps of providing a first drop tube segment and a second drop tube segment. While various orientations may be possible, the concepts of the present invention will be discussed with the first drop tube segment comprising the previously-mentioned upper drop tube segment 220 having the upper conduit 222 with the first wall 228 and the second drop tube segment comprising the previously-mentioned drop tube segment 100 having the conduit 102 with the second wall 111, as discussed above.

The sealing member 105 can be disposed adjacent the outer surface 111b of the second wall 111 of the conduit 102. Disposing the sealing member 105 adjacent the outer surface 111b may be performed at different stages in the method of making the drop tube assembly 250. For example, the sealing member 105 may be initially disposed adjacent the outer surface 111b of the second wall 111. In another example, the sealing member 105 may be disposed adjacent the outer surface 11b of the second wall 111 as the conduits are positioned relative to one another.

Figures 23, 24:
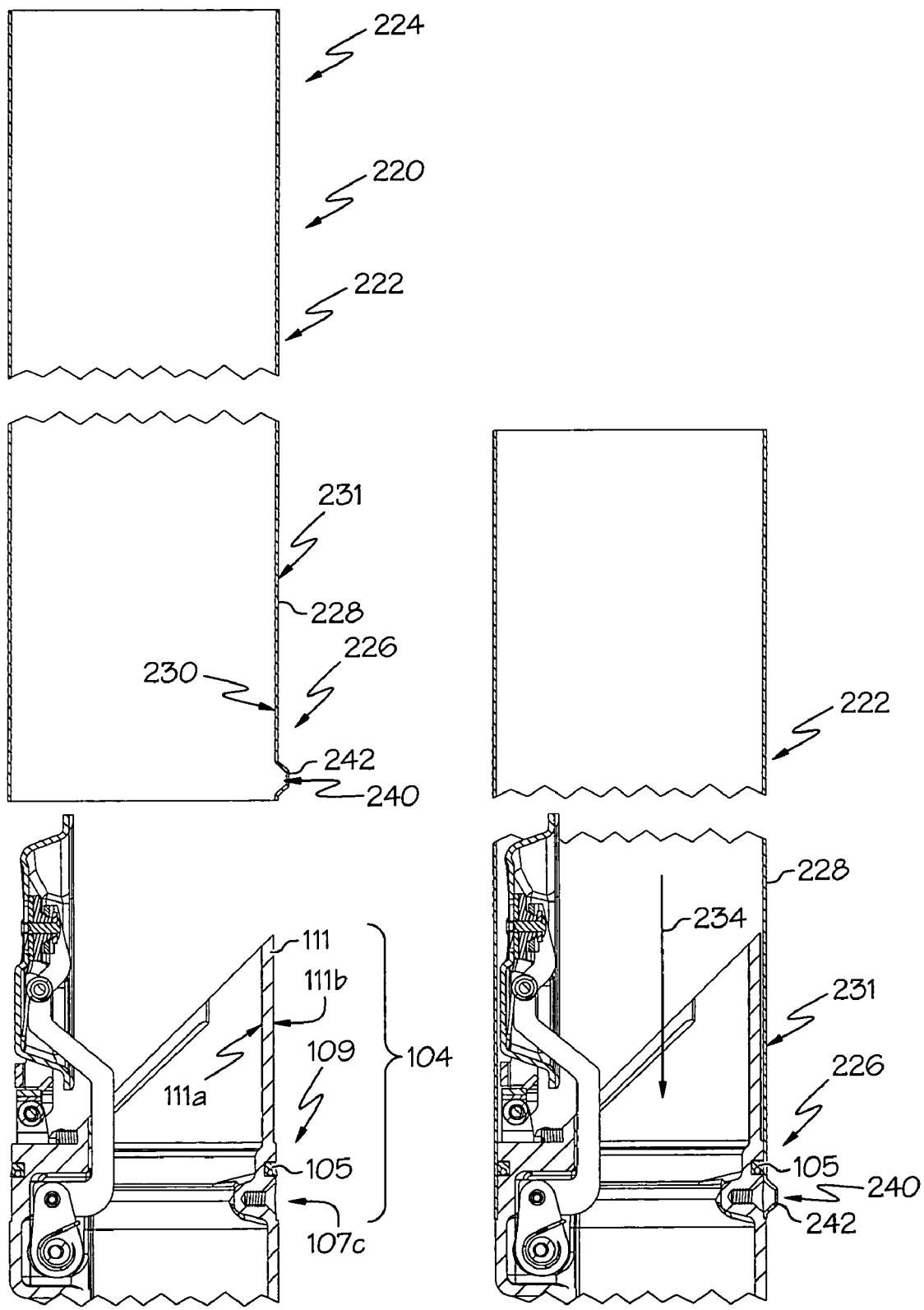
FIG. 23 illustrates a first and second conduit, in accordance with an exemplary embodiment of the present invention, prior to inserting a second end portion of the first conduit over the first end portion of the second conduit.
FIG. 24 illustrates a first and second conduit, in accordance with an exemplary embodiment of the present invention, after inserting a second end portion of the first conduit over the first end portion of the second conduit.

One or more apertures 240 may be formed at radial locations about a periphery of the second end portion 226 of the upper conduit 222. In embodiments where one or more fastener receiving structures are provided, the one or more apertures 240 may be formed such that each aperture may be aligned with a corresponding one of the fastener receiving structures. In embodiments without one or more fastener receiving structures, the one or more apertures 240 may be formed so that a corresponding fastener may simply engage an outer surface 111b of the wall 111. Formation of the one or more apertures 240 may occur at various stages during assembly of the drop tube assembly. In one example, the one or more apertures 240 are formed prior to positioning the conduits relative to one another. In certain examples, an internal deburring or chamfering procedure may be performed to prevent damage to the seal when attaching the conduits together. In particular embodiments, each aperture 240 may be shaped adjacent the inner surface 230 of the first wall 228 such that edges 242 of the aperture 240 extend radially outwardly away from an outer surface 231 of the first wall 228 as shown in FIG. 23. In one example, shaping of the aperture can occur as the aperture is formed. For instance, a punch may be provided to engage the inner surface 230 to punch the aperture and thereafter extend the edges 242 of the aperture 240 radially outwardly away from the outer surface 231 of the first wall 228.

As shown in FIG. 24, a second end portion 226 of the upper conduit 222 can be inserted over the first end portion 104 of the conduit 102 while the edges 242 of the aperture 240 extend radially outwardly away from the outer surface 231 of the first wall 228. As the edges 242 extend outwardly, the aperture 240 may then pass over the sealing member 105 without damaging the sealing member 105. Once the conduits are positioned relative to one another, the interstitial space 232 (see FIG. 26A) may be formed between at least portions of the inner surface 230 of the first wall 228 and the outer surface 111b of the second wall 111. As shown in FIG. 24, at least portions of the upper conduit 222 and the conduit 102 cooperate to define the liquid flow path 234 wherein the sealing member 105 is at least partially disposed between the first wall 111 and the second wall 228 such that the sealing member 105 is operative to inhibit, such as prevent, fluid communication between the interstitial space 232 and the liquid flow path 234. A fastener 246 may be inserted through the aperture 240 and the interstitial space 232 to engage the second wall 111. Although not necessary, in one particular example, one or more fastener receiving structures 107a, 107b, 107c may be located on the second wall 111 that are devoid of any opening extending between the inner surface 111a and the outer surface 111b as discussed above. In this embodiment, the fastener 246 may engage the second wall 111 by engaging a corresponding one of the fastener receiving structures 107a, 107b, 107c located on the second wall 111.

Figure 25:
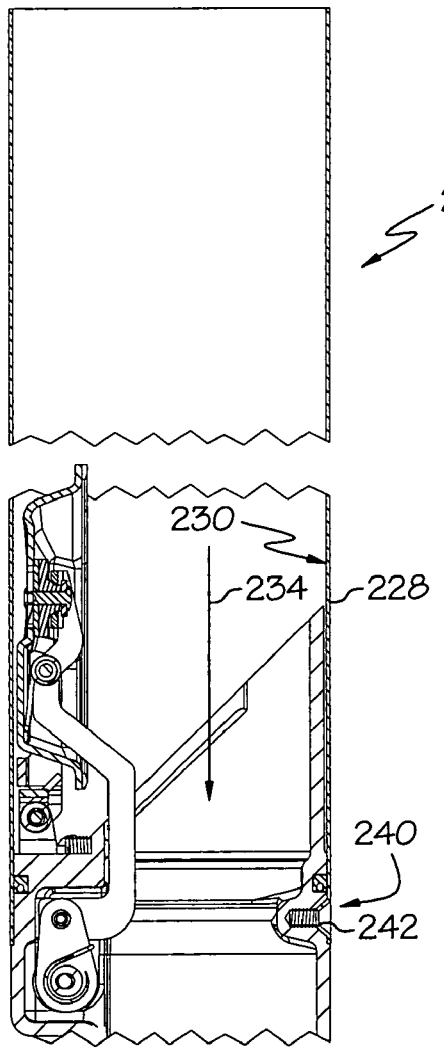
FIG. 25 illustrates a first and second conduit, in accordance with an exemplary embodiment of the present invention, after shaping an aperture formed through a first wall of the first conduit such that edges of the aperture extend radially inwardly from an inner surface of the first wall.

As shown in FIG. 25, prior or during insertion of the fastener 246, the aperture 240 may also be shaped adjacent the inner surface 230 of the first wall 228 such that the edges 242 of the aperture 240 extend radially inwardly from the inner surface 230 of the first wall 228. For example, tightening of the fastener 246 may cause such shaping of the aperture. In further examples, a stamping procedure may be used to shape the aperture 240 adjacent the inner surface 230 of the first wall 228 such that the edges 242 of the aperture extend radially inwardly from the inner surface 230 of the first wall 228. In one example, the stamping procedure may include positioning a punch tool adjacent the aperture and using a hammer to shape the edges of the aperture. In the particular example illustrated in FIG. 25, a punch tool may be used to shape the aperture 240 such that edges 242 of the aperture extend radially inwardly from the inner surface 230 of the first wall 228 and into the cavity, if provided. As shown in FIG. 26, a fastener 246 may then be engaged with the fastener receiving structure and tightened such that the fastener 246 engages a crimped portion 244 of the first wall 228 and a corresponding one of the fastener receiving structures 107a, 107b, 107c. As shown in FIG. 26, the first drop tube segment 100 is attached to the second drop tube segment 220 wherein the sealing member 105 inhibits, such as prevents, fluid communication between the interstitial space 232 and the liquid flow path 234 without necessarily requiring the use of an epoxy sealant layer.

Sealing members described throughout this application can comprise resilient seals such as an O-ring, or the like, and can be formed a wide variety of materials such as an elastomer. Certain sealing members might comprise a Poly-Pak® seal available from Parker-Hannifin Corp. It is understood that additional exemplary sealing members might comprise a nonannular shape, for example, to match the shape of the sealing surface. In additional embodiments, a nonresilient sealing member might be used wherein the seal is obtained by compressing, such as crushing the sealing member. However, a resilient sealing member might be desirable to allow repeated breakdown and refastening of the drop tube segments without replacing the sealing member.

The foregoing description of the various examples and embodiments of the invention has been presented for the purposes of illustration and description. It is noted that a wide variety of additional embodiments may incorporate the concepts of the present invention. For example, additional embodiments of the invention may include inventive concepts presented herein in combination with features and concepts disclosed in U.S. Pat. No. 4,986,320. The description of the various examples and embodiments of the invention is not intended to be exhaustive or to limit the invention to the precise form disclosed. Many alternatives, modifications and variations will be apparent to those skilled in the art. Accordingly, this invention is intended to embrace all alternatives, modifications and variations that have been discussed herein, and others that fall within the spirit and broad scope of the claims.

We claim:

1. A drop tube assembly adapted for use with a liquid reservoir, the drop tube assembly comprising:
   a) a first drop tube segment comprising a first conduit including first and second end portions, at least the second end portion of the first conduit having a first wall with an inner surface, wherein the first wall includes edges defining an aperture;
   b) a second drop tube segment comprising:
      i) a second conduit including first and second end portions, at least the first end portion of the second conduit having a second wall with inner and outer surfaces, wherein the second end portion of the first conduit and the first end portion of the second conduit are attached together, at least portions of the first and second conduits cooperating to at least partially define a liquid flow path, and a fastener receiving structure on the second wall, with the fastener receiving structure being devoid of any opening extending between the inner and outer surfaces of the second wall; and
      ii) a valve assembly comprising: a valve member associated with the first
   end portion of the second conduit, a float, and a linkage device pivotally connected with respect to the valve member and adapted for communication with the float such that the float may facilitate in adjusting the position of the valve member with respect to the first end portion of the second conduit in response to a liquid level in a liquid reservoir;
   c) an interstitial space interposed between at least portions of the inner surface of the first wall and the outer surface of the second wall;
   d) a fastener extending through the aperture and the interstitial space to engage the fastener receiving structure, wherein the fastener at least partially secures the first conduit relative to the second conduit; and
   e) a sealing member at least partially disposed between the first wall and the second wall, the sealing member being operative to inhibit fluid communication between the interstitial space and the liquid flow path;
   wherein, the edges have a first position and a second position, wherein the edges when in the first position of the first wall extend radially outwardly from other portions of the first wall adjacent to the edges, and when in the second position extend radially inwardly from other portions of the first wall adjacent to the edges, the edges of the first wall are shaped at least partially into the fastener receiving structure after the first conduit is attached to the second conduit to assist in securement of the first conduit relative to the second conduit.

2. The drop tube assembly of claim 1, wherein the fastener receiving structure includes a cavity.

3. The drop tube assembly of claim 2, wherein the edges include a crimped portion.

4. The drop tube assembly of claim 3, wherein the fastener engages the cavity and the crimped portion.

5. A drop tube assembly adapted for use with a liquid reservoir, the drop tube assembly comprising:
   a) an upstream drop tube segment comprising an upstream conduit including first and second end portions, at least the second end portion of the upstream conduit having a first wall with an inner surface, wherein the first wall includes edges defining an aperture;

b) a downstream drop tube segment comprising:
   i) a downstream conduit including first and second end portions, at least the first end portion of the downstream conduit having a second wall with inner and outer surfaces, wherein the second end portion of the upstream conduit and the first end portion of the downstream conduit are attached together, at least portions of the upstream and downstream conduits cooperating to at least partially define a liquid flow path with a substantial portion of the upstream conduit being positioned upstream of the downstream conduit, and a fastener receiving structure on the second wall, with the fastener receiving structure being devoid of any opening extending between the inner and outer surfaces of the second wall; and
   ii) a valve assembly comprising: a valve member associated with the first end portion of the downstream conduit, a float, and a linkage device pivotally connected with respect to the valve member and adapted for communication with the float such that the float may facilitate in adjusting the position of the valve member with respect to the first end portion of the downstream conduit in response to a liquid level in a liquid reservoir;

c) a sealing member at least partially disposed between the first and second walls, the sealing member being disposed upstream of the fastener receiving structure; and d) a fastener extending through the aperture to engage the fastener receiving structure, wherein the fastener at least partially secures the upstream conduit relative to the downstream conduit;

wherein, the edges have a first position and a second position, wherein the edges when in the first position of the first wall extend radially outwardly from other portions of the first wall adjacent to the edges, and when in the second position extend radially inwardly from other portions of the first wall adjacent to the edges, the edges of the first wall are shaped at least partially into the fastener receiving structure to assist in securement of the upstream conduit relative to the downstream conduit.

6. The drop tube assembly of claim 5, further comprising an interstitial space interposed between at least portions of the inner surface of the first wall and the outer surface of the second wall.

7. The drop tube assembly of claim 6, wherein the fastener extends through the interstitial space to engage the fastener receiving structure and the sealing member is operative to inhibit fluid communication between the interstitial space and the liquid flow path.

8. The drop tube assembly of claim 5, wherein the fastener receiving structure includes a cavity.

9. The drop tube assembly of claim 8, wherein the edges include a crimped portion.

10. The drop tube assembly of claim 9, wherein the fastener engages the cavity and the crimped portion.

11. A method of making a drop tube assembly adapted for use with a liquid reservoir, comprising the steps of:
   a) providing a first drop tube segment comprising a first conduit including first and second end portions, at least the second end portion of the first conduit having a first wall with an inner surface and an outer surface;
   b) providing a second drop tube segment comprising a second conduit including first and second end portions, at least the first end portion of the second conduit having a second wall with inner and outer surfaces;
   c) disposing a sealing member adjacent the outer surface of the second wall;
   d) providing a fastener;
   e) forming at least one aperture through the first wall;
   f) shaping the aperture adjacent the inner surface of the first wall such that edges of the aperture extend radially outwardly away from the outer surface of the first wall;
   g) inserting the second end portion of the first conduit over the first end portion of the second conduit while the edges of the aperture extend radially outwardly away from the outer surface of the first wall such that the aperture passes over the sealing member to form an interstitial space between at least portions of the inner surface of the first wall and the outer surface of the second wall, wherein at least portions of the first and second conduits cooperate to define a liquid flow path and wherein the sealing member is at least partially disposed between the first wall and the second wall, the sealing member being operative to inhibit fluid communication between the interstitial space and the liquid flow path; and
   h) attaching the first conduit to the second conduit by inserting the fastener through the aperture and the interstitial space to engage the second wall.

12. The method of claim 11, wherein, after the step of inserting the second end portion of the first conduit over the first end portion of the second conduit, performing the further step of shaping the aperture adjacent the inner surface of the first wall such that the edges of the aperture extend radially inwardly from the inner surface of the first wall.

13. The method of claim 11, wherein the step of providing a second conduit includes providing the second wall with a fastener receiving structure, wherein the fastener receiving structure is devoid of any opening extending between the inner and outer surfaces of the second wall.

14. The method of claim 13, wherein, after the step of inserting the second end portion of the first conduit over the first end portion of the second conduit, performing the further step of shaping the aperture adjacent the inner surface of the first wall such that the edges of the aperture extend radially inwardly from the inner surface of the first wall.

15. The method of claim 13, wherein the step of attaching the first conduit to the second conduit further comprises the step of tightening the fastener such that the fastener engages a crimped portion of the first wall and the fastener receiving structure.

* * * * *